UNITED STATES PATENT OFFICE.

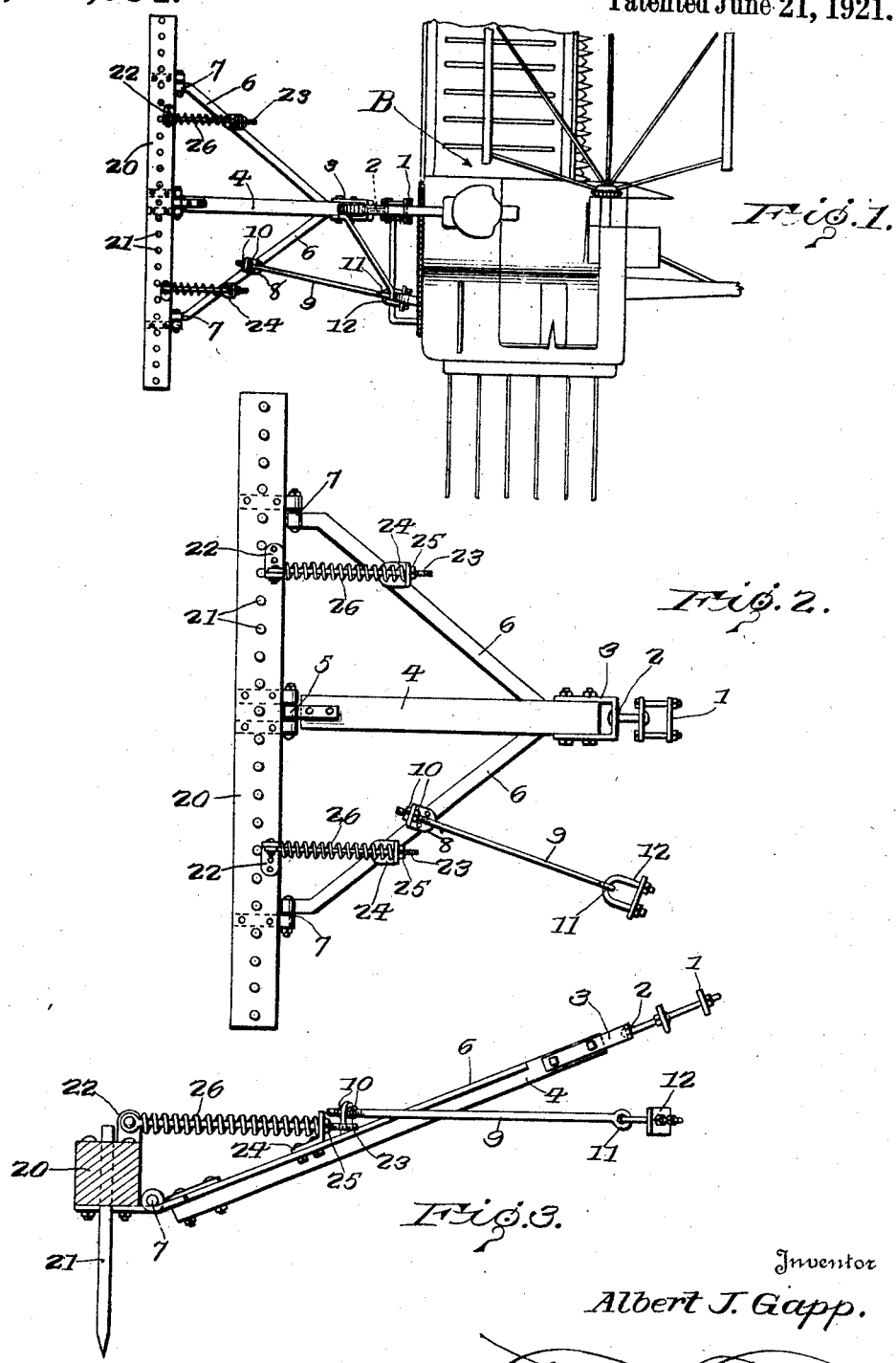

ALBERT J. GAPP, OF WALES, NORTH DAKOTA.

BINDER ATTACHMENT.

1,381,984. Specification of Letters Patent. Patented June 21, 1921.

Application filed November 13, 1920. Serial No. 423,841.

*To all whom it may concern:*

Be it known that I, ALBERT J. GAPP, a citizen of the United States, residing at Wales, in the county of Cavalier, State of North Dakota, have invented certain new and useful Improvements in Binder Attachments; and I do hereby declare the following to be a full, clear, and exact description of the invention, such as will enable others skilled in the art to which it appertains to make and use the same.

This invention relates to harvesters, and more especially to grain binders; and the object of the same is to provide a raking attachment capable of being dragged by and behind the binder for covering the seeds of wild oats and weeds which are cut by the machine and left on the field.

In this and other sections of the country, it is several weeks after grain is cut before threshing is completed and the farmer is at liberty to plow the land where the grain grew. During this interval the wild oats and weeds which were cut at the passage of the harvester machine but not bound with the grain, lie exposed on the surface of the ground until so late in the season that, when the field is plowed and the weed seeds turned in, it is too cold for them to germinate and the result is that they come up with the grain next year. It has occurred to me that if means could be provided whereby the weed seeds could be turned under or covered by the soil at the time the grain is cut, they would have an opportunity to germinate and grow to some extent before cold weather, and then their tops could be cut off before they go to seed or they could be plowed under—the result being that there would be no seed left in the ground to come up with the grain in the spring. Accordingly I have devised the present invention as an attachment to the binder, to be dragged by it for the purpose of covering the weed seeds at the time the machine passes across the field. Its details of construction and its operation are set forth below and shown in the drawings wherein:

Figure 1 is a plan view showing a grain binder in diagram with this attachment hitched to and dragged by it in rear of its platform.

Fig. 2 is an enlarged plan view of the attachment alone.

Fig. 3 is a side elevation of the attachment, with the cross bar in section.

To some part of the binder B, and by preference to some part of its platform, is connected a clip 1 to which is swiveled at 2 a clevis 3 at the front end of a beam 4 which leads to the rear and is hinged at 5 to the lower front corner of a cross bar. Oblique braces 6 diverge from said beam toward the ends of the bar, and are hinged at 7 to it, the pintles of all hinges being in alinement. Leading through a bracket 8 on one brace is a rod 9 preferably having nuts 10 in front and rear of the bracket and an eye 11 at its front end, and linked into this eye is a clevis 12 also for attachment to some part of the binder, so that the entire device will not swing too far to one side when the binder is turned.

Said cross bar 20 may well be a 4 by 4 piece of lumber about the same length as the cutting apparatus on the binder or a little longer, and by it are carried or through it are fixed a number of substantially upright rake teeth 21. I find that about thirty of these teeth will answer, and they should be about fourteen inches long and should stand about two inches apart. Brackets 22 rise from the cross bar at appropriate points, and to them are linked the rear ends of eye-bolts 23, their forward ends passing through other brackets 24 on the braces 6 and having nuts 25 forward of said brackets; and on each bolt between the brackets 22 and 24 is disposed a stout coiled spring 26. The purpose of these springs is to hold the beam or tongue 4 and its braces 6 normally at a proper angle to the cross bar or rake head 20 to maintain the teeth 21 substantially in a vertical plane, while yet permitting the entire cross bar to rock on its hinges in case the teeth strike an obstruction in the ground.

With this attachment applied to and dragged by a binder as it crosses a field, the sickle cuts all growing matter which is of sufficient height, but only the grain is bound. The result is that wild oats and other weeds are cut by the sickle and dropped onto the ground, and the rake which follows the cutting apparatus covers these weeds or at least puts enough earth over their seeds to result in planting them. As above stated, threshing occupies the farmer's time for some weeks and he does not have an immediate opportunity to get back to the field and plow it up. Meanwhile the weeds sprout and grow to some little height, and therefore by the time the farmer plows the field he turns these weeds under or destroys them before they have had time to go to seed again—hence the ground is fertilized by the tops which are plowed in, and no seeds are left to come up the following spring. It will thus be seen that by the simple expedient of dragging a rake behind a binder to cover and in effect to plant the seeds of the weeds that are cut at that time, the beneficial results above outlined are obtained.

What is claimed is:

1. The herein described weed seed covering attachment for binders, the same comprising a rake consisting of a cross bar and a series of upright teeth therethrough, a beam and rearwardly diverging braces hinged at their rear ends to the front lower corner of said bar, means for attaching the front end of the beam to the binder, and yielding means connecting the top of the bar with said braces for holding the bar normally in position to maintain its teeth upright.

2. In a structure of the type described, the combination with a rake consisting of a rectangular cross bar and a series of upright teeth therethrough; of a beam and diverging braces all hinged to the front lower corner of said bar, brackets rising from the bar and from the braces, eye-bolts pivoted in the brackets on the bar and leading through the brackets on the braces and carrying nuts, and an expansive spring coiled on each bolt between the brackets.

In testimony whereof, I affix my signature, in the presence of two witnesses.

ALBERT J. GAPP.

Witnesses:
 ERNEST GAPP,
 HENRY BERGMAN.